(12) United States Patent
French et al.

(10) Patent No.: US 7,831,692 B2
(45) Date of Patent: Nov. 9, 2010

(54) METHOD AND SYSTEM FOR AUTOMATICALLY ASSOCIATING AN ADDRESS WITH A TARGET DEVICE

(75) Inventors: Steven M. French, Austin, TX (US); Lorin E. Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2455 days.

(21) Appl. No.: 09/731,629

(22) Filed: Dec. 7, 2000

(65) Prior Publication Data
US 2002/0073249 A1    Jun. 13, 2002

(51) Int. Cl.
*G06F 15/177* (2006.01)
(52) U.S. Cl. .......................... 709/220; 709/223; 713/7; 717/175; 379/88.14; 711/147
(58) Field of Classification Search .................. 709/220, 709/224, 223; 717/175, 147; 711/147; 713/7; 379/88.14
See application file for complete search history.

(56) References Cited

U.S. PATENT DOCUMENTS

| 5,457,122 | A  | * | 10/1995 | Konno et al. ................. 514/423 |
| 5,788,508 | A  | * | 8/1998  | Lee et al. ..................... 434/350 |
| 6,182,275 | B1 | * | 1/2001  | Beelitz et al. ................ 717/175 |
| 6,411,684 | B1 | * | 6/2002  | Cohn et al. ............... 379/88.14 |
| 6,457,122 | B1 | * | 9/2002  | Ramezani ...................... 713/1 |
| 6,477,624 | B1 | * | 11/2002 | Kedem et al. ................ 711/147 |

* cited by examiner

*Primary Examiner*—Tammy T Nguyen
(74) *Attorney, Agent, or Firm*—Yee & Associates, P.C.; Jeffrey S. LaBaw

(57) ABSTRACT

A method of generating a list of target devices to be configured in communication with a server is provided. A first list of target devices to be configured is created. At least one target device having an associated network address is identified and the first list of target devices is modified using the addressed target device. A modified list of target devices is then generated. Programs and systems of generating a list of target devices to be configured are also provided.

26 Claims, 5 Drawing Sheets

METHOD AND SYSTEM FOR AUTOMATICALLY ASSOCIATING AN ADDRESS WITH A TARGET DEVICE

BACKGROUND OF THE INVENTION

1. Field of the Invention

The present invention relates to client computers that are bootable over a network and, in particular to client computers which may be serviced by multiple boot servers. More specifically, the present invention relates to methods of associating MAC addresses with specific target devices for automatic distribution of operating system software to target devices.

2. Description of the Related Art

Some current computing devices include support for preboot extensions to download an operating system (OS) a network to which they are attached. Such target computing devices include computer motherboards, network adapters and boot diskettes. These devices rely on extensions to the bootstrap protocol (BOOTP) and to the dynamic host configuration protocol (DHCP). Such extensions are often termed the preboot execution environment (PXE) and require a DHCP/PXE server and a boot image negotiation layer (BINL) server. In order to distribute the operating system software to these target devices, a MAC address of the network adapter is used in part to identify each machine to the server. The MAC address is used with network boot transfer file protocols such as PXE to transfer executable images to a target device.

BOOTP is a transmission control protocol/Internet protocol (TCP/IP) used by a diskless workstation, network computer (NC) or other target device to obtain its IP address and other network information, such as server address and default gateway. Upon startup, the target device sends out a BOOTP request to the BOOTP server, which returns the required information. The BOOTP request and response use an IP broadcast function, which is able to send messages before a specific IP address for a target device is known.

DHCP is software that automatically assigns an IP address to a target device logging onto a TCP/IP network. DHCP eliminates the need for manually assigning permanent IP addresses.

PXE enables a client network computer or other target device that lacks a native operating system to locate and acquire a small network bootstrap program (NBP) from a BINL server. The target device may acquire this NBP from a BINL server through a network attachment. PXE also provides a means for running the NPB on the target device. This allows the target device to continue acquiring additional software from the network that may be required to make the target device capable of performing the more complex and useful tasks assigned to it by an enterprise.

PXE relies on extensions of DHCP as the means by which the target device locates a BINL server from which to acquire an NPB. A facilitating property of DHCP is that the target device does not need the address of any other computer. The target device performs a DHCP broadcast to discover any PXE proxy server that can recognize that the target device is PXE-capable. The DHCP proxy server sends a DHCP offer to the target device. The offer contains the address of the BINL server from which the target device may obtain a NBP. The target device then obtains the NBP and all necessary software from the boot server via a trivial file transfer protocol (TFTP).

Current approaches to distributing an operating system to one or more target machines require that the administrator distributing the software know which MAC address is associated with a given target device. These MAC addresses are often long strings of numbers. Currently, an administrator may "see" one or more devices connected to the server and may even have a list of the MAC addresses of all devices associated with the server. However, in order to determine which MAC address is for each device, the administrator must physically look for the MAC address on a target device or guide a user logged on to the device to look for the MAC address on the target device. Once the administrator has the MAC address, he manually enters, number by number the MAC address of each target machine that requires OS software to be distributed to it. This process is replete with the potential for error.

It would be desirable therefore to provide a method and system to overcome the above.

SUMMARY OF THE INVENTION

One aspect of the present invention provides a method of generating a list of target devices to be configured in communication with a server. A first list of target devices to be configured is created. At least one target device having an associated network address is identified. The first list of target devices is modified using the addressed target device and a modified list of target devices to be configured is generated.

The target device may be listed in at least one information source. The associated network address of the target device or the target device may be added to the first list of target devices. The target device having an associated network address may also be removed from the first list of target devices. A target device may be preconfigured and may be added to the first of target devices. It may be determined if a target device has an associated network address and the target device may be removed from the modified list of target devices if it does not have an associated network address. The modified list may be provided to the server. The target devices on the modified list may be configured. Packet data or log data may be examined to determine if the target device has an associated network address.

Another aspect of the present invention provides computer program product in a computer usable medium for generating a list of target devices to be configured in communication with a server. The computer program product may include means for creating a first list of target devices to be configured, means for identifying at least one addressed target device having an associated network address, means for modifying the first list of target devices using the addressed target device and means for generating a modified list of target devices to be configured.

The computer program product may also include means for storing the identification of the addressed target device. The computer program product may also include means for adding the associated network address of the addressed target device to the first list of target devices. The computer program product may also include means for adding the addressed target device having an associated network address to the first list of target devices. The computer program product may also include means for removing the addressed target device having an associated network address from the first list of target devices. The computer program product may also include means for preconfiguring at least one target device listed in the first list of target devices. The computer program product may also include means for removing a target device without an associated network address from the modified list of target devices. The computer program product may also include means for configuring the target devices listed in the modified list. The computer program product may also include means for examining packet data or log data to determine if a target device has an associated network address.

Another aspect of the present invention provides a data processing system that may include means for creating a first list of target devices to be configured, means for identifying at least one addressed target device having an associated network address, means for comparing the addressed target device to the target devices on the first list, and means for generating a modified list of target devices to be configured based on the addressed target device. The system may also include means for storing information about the addressed target device. The system may also include means for configuring at least one target device. The system may also include means for determining if a target device has an associated network address.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims in equivalence thereof.

DETAILED DESCRIPTION

Figure 1:
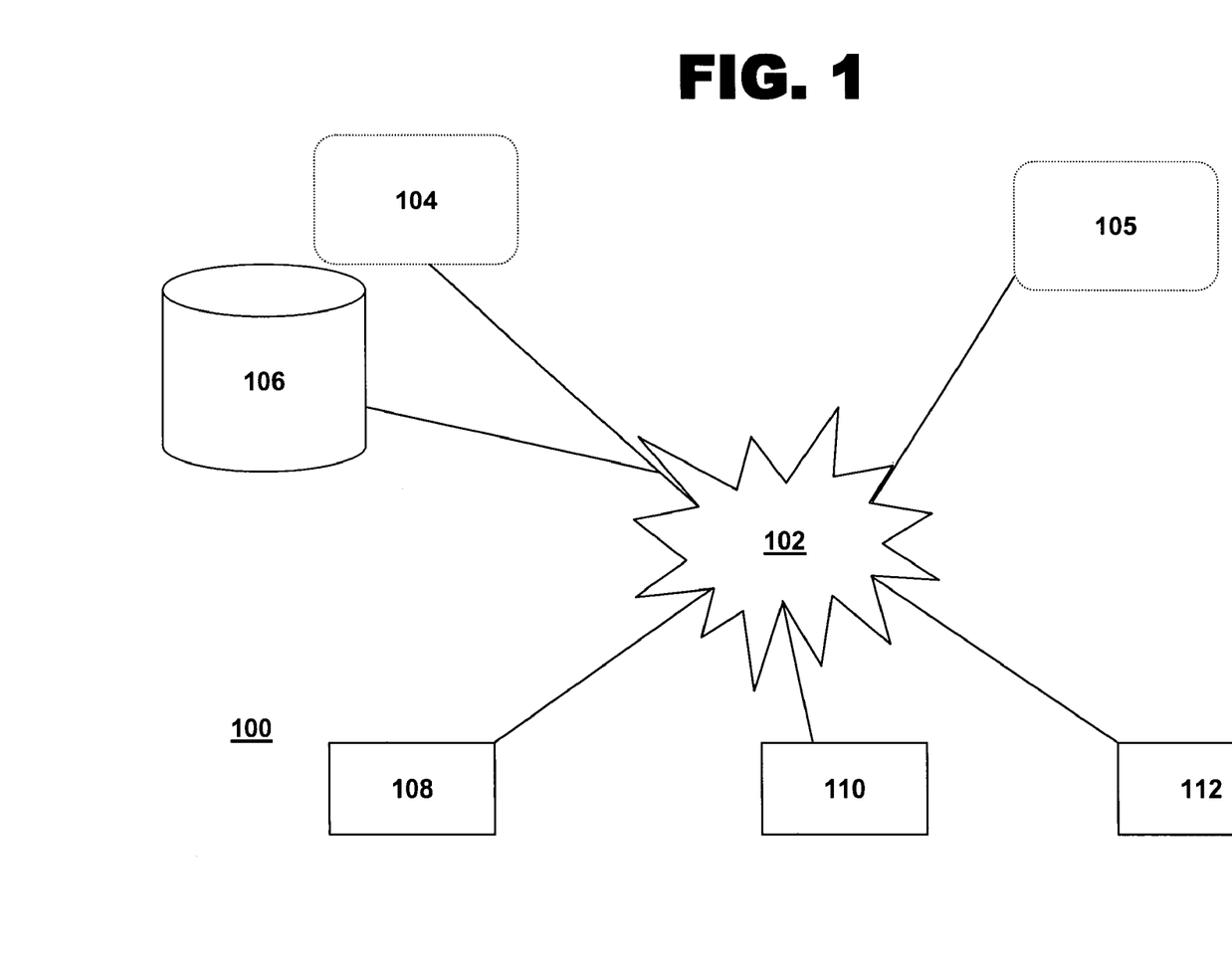
FIG. 1 is a schematic diagram of one embodiment of a network of data processing systems in accordance with the present invention.

FIG. 1 is a schematic representation of a network of data processing systems in accordance with the present invention at 100. Network data processing system 100 may be a network of computers in which the present invention may be implemented. Network data processing system 100 may contain a network. Network 102 may be any suitable medium used to provide communications links between various devices and computers connected to or in communication with each other within network data processing system 100. For example, network 102 may include connections, such as wire connections, wireless communication links or fiber optic cables.

In the embodiment of FIG. 1, a server 104 may be in communication with network 102. Server 104 may provide data, such as boot files, operating system images and applications to network 102 and/or to other components in communication with network 102 as described below. System 100 may also include another server 105 which may be identical to or different from server 104. Server 105 may also provide data, such as boot files, operating system images and applications to network 102 and/or to other components in communication with network 102 as described below. System 100 may also include additional servers (not shown).

One or more storage units, such as storage unit 106 may also be in communication with server 104, 105 and/or network 102. Storage unit 106 may store data, such as boot files, operating system images and applications that may be processed or conveyed by server 104. Storage unit 106 may also store data to be made available to or process by network 102 and/or to other components in communication with network 102 as described below.

In addition, target devices 108, 110 and 112 are also in communication with network 102. These target devices may be, for example, personal computers or network computers. Target devices 108, 110, 112 may serve as clients to server 104. Network data processing system 100 may include additional servers, clients and other devices not shown.

As seen in FIG. 1, network data processing system 100 may be any suitable system of processing data. For example system 100 may be the Internet. Alternatively, network data processing system 100 may also be any suitable type of network such as, for example, an intranet, a local area network (LAN) or a wide area network (WAN). In one embodiment of the invention, network 102 represents a worldwide collection of networks and gateways that use the TCP/IP suite of protocols to communicate with one another. A backbone of high-speed data communication lines between major nodes or host computers allows communication between thousands of commercial, government, educational and other computer systems that route data and messages.

One embodiment of the present invention provides a network environment, which may include a DHCP/PXE proxy server. For example, server 104 may be a DHCP/PXE proxy server. Alternatively, server 105 may be a DHCP/PXE proxy server. System 100 may also include one or more boot servers. For example server 104 or server 105 may serve as a boot server. These boot servers may be co-located on servers 104, 105 with the DHCP/PXE proxy servers. In one embodiment of the invention, one or more target devices, such as devices 108, 110, 112, may include pre-boot extensions that allow the devices to download OS information from a boot server.

Figure 2:
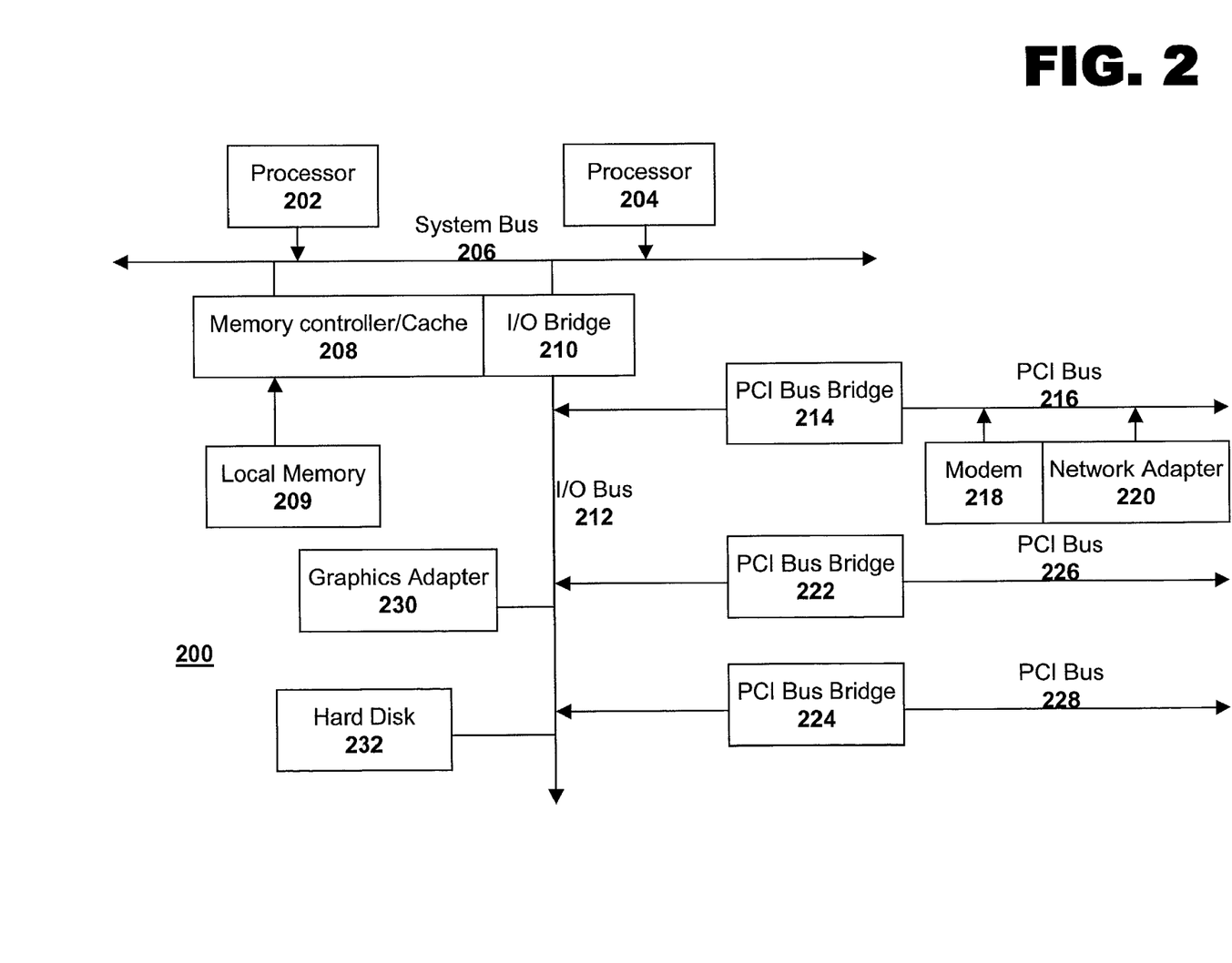
FIG. 2 is a block diagram of one embodiment of a data processing system in accordance with the present invention.

FIG. 2 is a block diagram of a data processing system in accordance with the present invention at 200. In one embodiment of the invention, data processing system 200 may be implemented as one or more of the servers 104, 105 shown in FIG. 1.

Data processing system 200 may be a symmetric multiprocessors (SMP) system including a plurality of processors 202 and 204 connected to system bus 206. Alternatively, a single processor system may be employed. Memory controller/cache 208 may also be connected to system bus 206. Memory controller/cache 208 may provide an interface to local memory 209. I/O bus bridge 210 may also be connected to system bus 206 and may provide an interface to I/O bus 212. Memory controller/cache 208 and I/O bus bridge 210 may be integrated as depicted or may be separate components.

Peripheral component interconnect (PCI) bus bridge 214 connected to I/O bus 212 may provide an interface to PCI local bus 216. One or more modems may be connected to PCI bus 216. Typical PCI bus implementations will support four PCI expansion slots or add-in connectors. Modem 218 and network 220 may be connected to PCI local bus 216. This connection may be through add-in boards. In one embodiment of the invention, modem 218 and accompanying connections provide communications links to target devices such as network computers. For example, such target devices may be those described above at FIG. 1.

Additional PCI bus bridges 222 and 224 may provide interfaces for additional PCI buses 226 and 228. Additional modems or network adapters may be supported from PCI buses 226 and 228. In this manner, data processing system 200 may allow connections to multiple network computers. A memory-mapped graphics adapter 230 and hard disk 232 may also be connected to I/O bus 212 as depicted, either directly or indirectly.

The components depicted in FIG. 2 may be arranged as shown or in any suitable manner that allows data processing system 200 to function as desired. Additionally, other peripheral devices, such as optical disk drives and the like, may be used in addition to or in place of the components depicted.

One embodiment of data processing system 200 may be an IBM RISC/System 6000 system, a product of International Business Machines Corporation in Armonk, N.Y., running the Advanced Interactive Executive (AIX) operating system.

Figure 3:
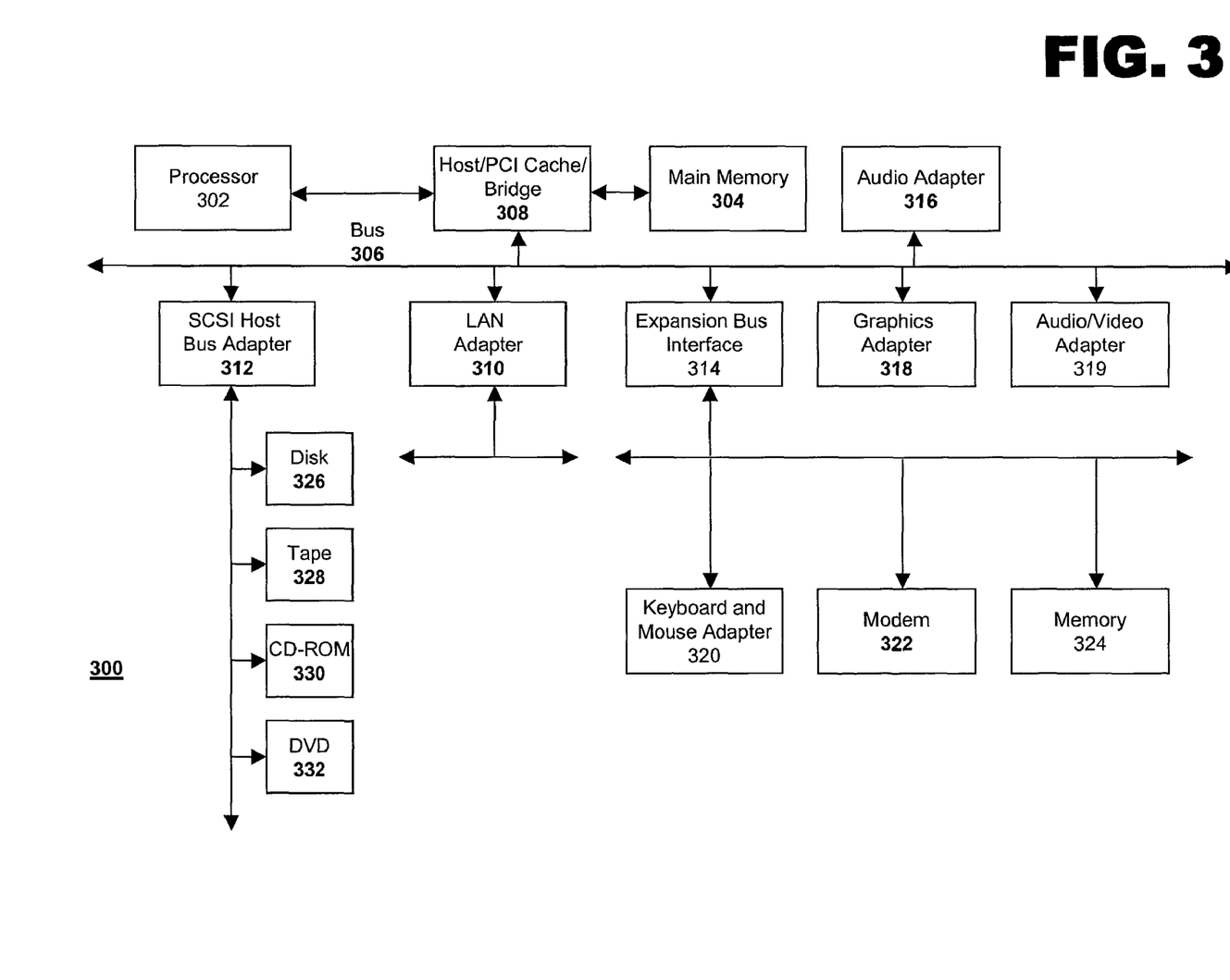
FIG. 3 is a block diagram of another embodiment of a data processing system in accordance with the present invention.

FIG. 3 is a block diagram of a data processing system in accordance with the present invention at 300. Data processing system 300 may be, for example, one or more of the target devices 108, 110, 112 depicted in FIG. 1 and described above. In one embodiment of the invention, data processing system 300 may be a stand-alone system configured to be bootable without relying on a network communication interface. Alternatively, data processing system 300 may also comprise one or more network communication interfaces. Data processing system 300 may also be a personal digital assistant (PDA) device. Data processing system may also take the form of a notebook computer or handheld computer. Alternatively, data processing system 300 may be a kiosk or Web appliance. The processes of the present invention may also be applied to a multiprocessor data processing system.

Data processing system 300 may employ a peripheral component interconnect (PCI) local bus architecture. Although the depicted example employs a PIC bus, other bus architectures such as Accelerated Graphics Port (AGP) and Industry Standard Architecture (ISA) may be used. Processor 302 and main memory 304 may be connected to PCI local bus 306 via PCI bridge 308. PCI bridge 308 may also include an integrated memory controller and cache memory for processor 302. Additional connections to PCI local bus 306 may be made through direct component interconnection or through add-in boards. In one embodiment of the invention, local area network (LAN) adapter 310, SCSI host bus adapter 312, and expansion bus interface 314 are connected to PCI local bus 306 by direct component connection. In contrast, audio adapter 316, graphics adapter 318 and audio/video adapter 319 are connected to PCI local bus 306 by add-in boards inserted into expansion slots. Expansion bus interface 314 may provide a connection for additional components such as, for example, a keyboard and mouse adapter 320, a modem 322 and additional memory 324. A small computer system interface (SCSI) host bus adapter 312 may provide a connection for additional components such as, for example, a hard disk drive 326, a tape drive 328, a CD-ROM drive 330 or a DVD 332. PCI local bus 306 may be any suitable local bus implementation. Typical PCI local bus implementations will support three or four PCI expansion slots or add-in connectors.

In one embodiment of the invention, an operating system (OS) may run on processor 302. This OS may be used to coordinate and provide control of various components within data processing system 300. The OS may be a commercially available operating system. In one embodiment of the invention, the OS is Windows 2000, which is available from Microsoft Corporation. An object oriented programming system may be in communication with the OS and may run in conjunction with the OS. For example, the object-oriented programming system may provide calls to the OS from programs or applications executing on data processing system 300. These programs or applications may be specific to the object-oriented programming system or may be programs or applications run by other programming systems. In one embodiment of the invention, the object-oriented programming system may be Java™, a trademark of Sun Microsystems, Inc.

Instructions for the OS, the object-oriented operating system, and applications or programs may be located on storage devices such as, for example, hard disk drive 326. These operating systems, applications and/or programs may be loaded into main memory 304 for execution by processor 302.

The components of system 300 depicted in FIG. 3 may be arranged as shown or in any suitable manner that allows data processing system 300 to function as desired. Other internal hardware or peripheral devices, such as flash ROM (or equivalent nonvolatile memory) or optical disk drives and the like, may be used in addition to or in place of the components depicted. For example, one embodiment of data processing system 300 may be configured with ROM and/or flash ROM in order to provide non-volatile memory for storing operating system files and/or user-generated data.

Figure 4:
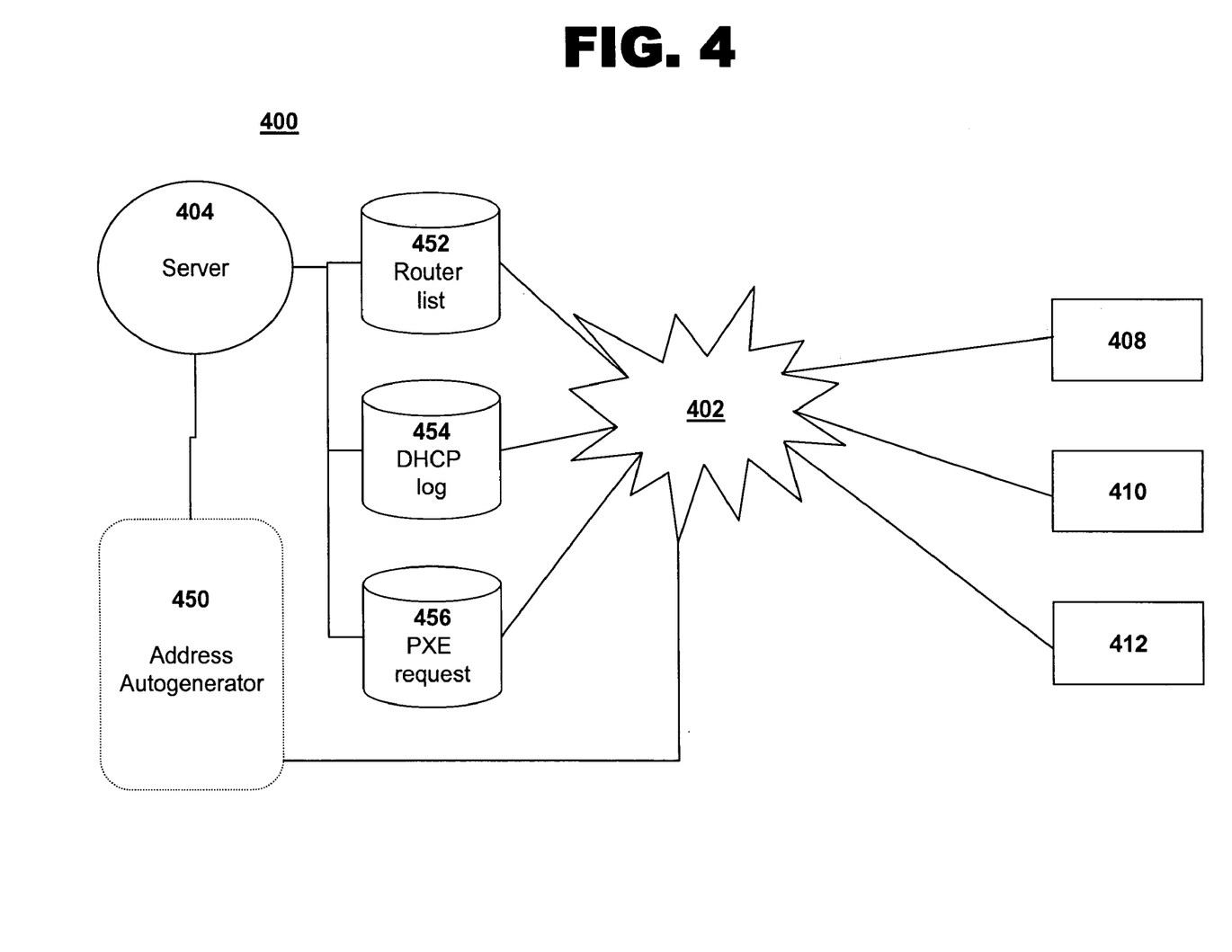
FIG. 4 is a schematic diagram of a system for automatically associating an address with a target device in accordance with the present invention.

FIG. 4 is a schematic diagram of a system for automatically associating an address with a target device in accordance with the present invention at 400. The autogenerator system 400 of the present invention or portions of system 400 may be included in any of the systems 100, 200, 300 described above. Alternatively, system 400 may be connected to or in communication with any of the systems 100, 200, 300 or with any suitable components of the systems 100, 200, 300 described above.

In one embodiment of the invention, system 400 may include a network 402. Network 402 may be any suitable medium used to provide communications links between various devices and computers connected to or in communication with each other within autogenerator system 400. For example, network 402 may include connections, such as wire connections, wireless communication links or fiber optic cables.

System 400 may also include a server 404 in communication with network 102. Server 404 may provide or distribute data, such as boot files, operating system images and applications to network 402 and/or to other components in communication with network 402 as described below. System 400 may also include other servers or component not shown.

System 400 may also include an address autogenerator 450 in communication with network 402. Address autogenerator 450 may be, for example, a software program capable of providing MAC addresses. In one embodiment of the invention address autogenerator may provide these addresses to server 404 or to an administrator of such a server. Address autogenerator 450 may also be located on server 404 or may be connected to or in communication with server 404. Alternatively, address autogenerator 450 may be located on another server connected to or in communication with network 402 or other components of network 402.

System 400 may also include one or more target devices 408, 410, 412 in communication with network 402. These target devices may be, for example, personal computers or network computers. Target devices 408, 410, 412 may serve as clients to server 404. Network data processing system 400 may include additional clients and other devices not shown.

In one embodiment of the invention, address autogenerator 450 is capable of discovering whether or not these target devices have MAC addresses. Alternatively, address autogenerator 450 is capable of discovering what the MAC address is for each target device. Address autogenerator 450 may also be able to configure each target device. For example, address autogenerator 450 may configure one or more target machines for prediscovery of network card information. Information on the network card typically includes a MAC address for the device using the network card or adapter. Address autogenerator 450 may also be capable of iterating the MAC addresses found and indicating them to the server 404 or to an administrator of such a server or to any component of system 400 which needs to know the MAC address of one or more of the target devices 408, 410, 412. In one embodiment of the invention, address autogenerator 450 is capable of determining the MAC address of one or more target devices, determining if the target device has been configured as desired. The establishment of the MAC address is usually one of the first steps in configuring a target device, particularly a computer or network client. Thus, the existence of an MAC address on a target device which shows no other configuration data would signal the device has not been configured. Moreover, address autogenerator 450 may be capable of only presenting the MAC addresses of target devices that have yet to be configured as desired.

Address autogenerator 450 may determine the MAC address of a target device by querying one or more information sources. In one embodiment, address autogenerator determines the MAC address collectively from these information sources. These information sources may be located on server 404, on other servers or on one or more of target devices or other devices in communication with address autogenerator 450. These information sources may also be connected to or in communication with address autogenerator 450 in any suitable manner, such as, for example, via network 402.

For example, address autogenerator 450 may query a router list 452. Router list 452 may list target devices and their associated MAC addresses that are routed through a router, for example, a router on server 404 or a router in communication with network 402. These target devices and their associated MAC addresses may be provided to server 404 or to an administrator of the server. For example, the addresses may be provided via techniques well known in the art such as SNMP protocol (IF Table) or via a log in which packets may be filtered to obtain address, such as a network snoopers log.

Alternatively, address autogenerator 450 may query a DHCP log 454. DHCP log 454 may list recent requests or acknowledgements from devices logging onto a network such as network 402. A target device that requests DHCP software may be indicating that it needs an OS. Thus, these target devices and their associated MAC addresses may be provided to server 404 or to an administrator of the server separately or in conjunction with the information provided from router list 452.

Alternatively, address autogenerator 450 may query a PXE request packet 456. PXE request packet 456 may list recent requests from devices logging onto a network such as network 402. A target device that requests PXE software may be indicating that it needs an OS. Thus, these target devices and their associated MAC addresses may be provided to server 404 or to an administrator of the server separately or in conjunction with the information provided from router list 452 and/or from DHCP log 454.

Alternatively, address autogenerator 450 may use any suitable algorithm which discovers devices using the TCP/IP PPP query/response protocols described above. Such an algorithm may be, for example, a distributed network scanning algorithm such as ICMP Ping or PPPoE session creation. If necessary, address autogenerator 450 may use this algorithm in unison with the packet filtering described above as required.

Address autogenerator 450 may also query any information source in addition to those described above, particularly any information source able to identify a target device and indicate the MAC address associated with the target device.

Figure 5:
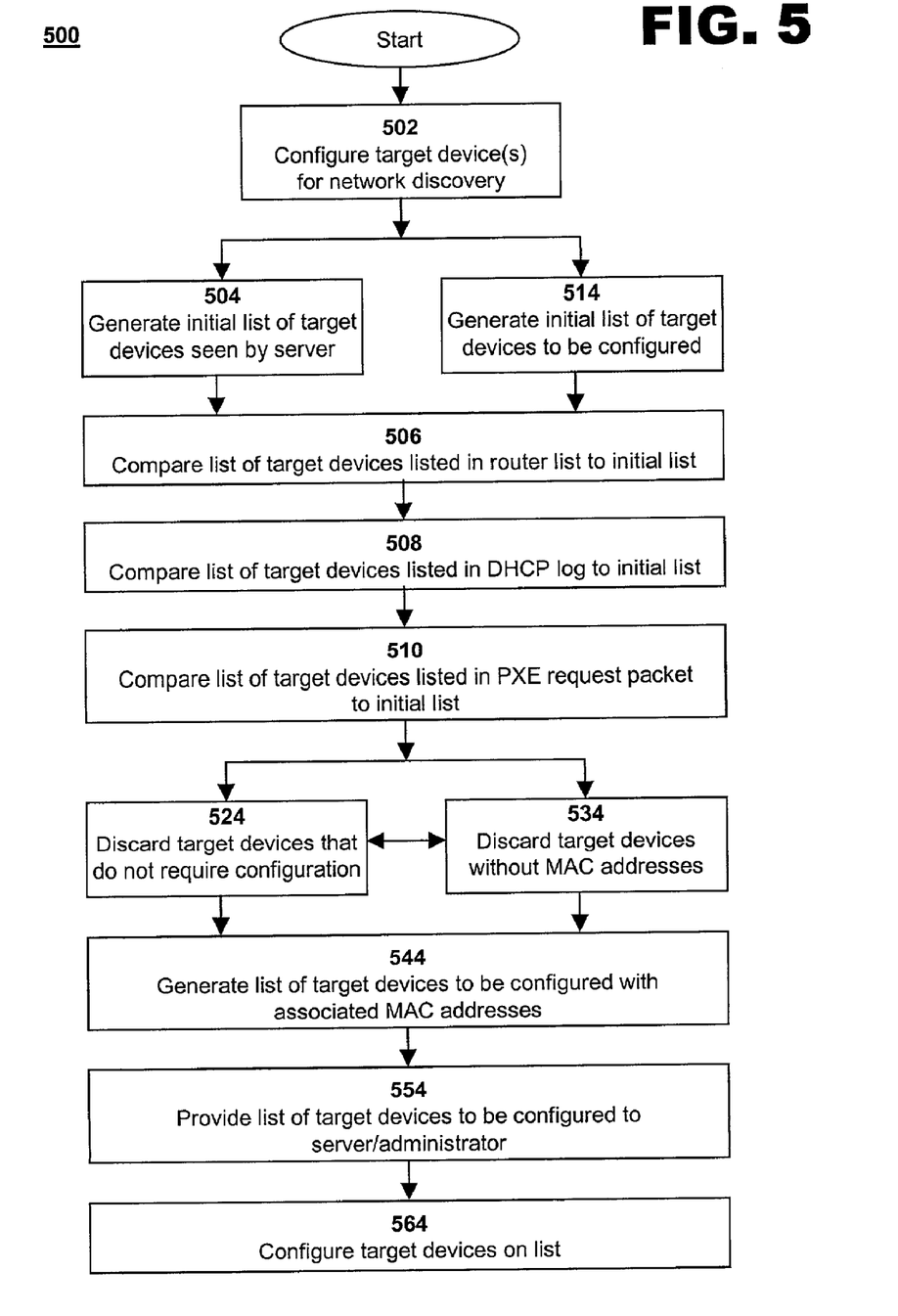
FIG. 5 is a flow diagram of one embodiment of a method for automatically associating an address with a target device in accordance with the present invention.

FIG. 5 is a flow diagram of one embodiment of a method for automatically associating an address with a target device in accordance with the present invention.

At Block 502, one or more target devices are configured for pre-discovery of network card information. For example, target devices 408, 410, 412, may be suitably configured.

At Block 504, an initial list of target devices seen by the server may be generated. Alternatively, at block 514, an initial list of target devices requiring configuration may be generated. This initial list of devices requiring configuration may include devices which the server or administrator of the server already recognize as requiring OS distribution.

At Block 506, a list of target devices that are listed by the router list is compared to either the initial list generated at 504 or at 514. The initial list of target devices is modified based on the list of target devices listed by the router list. For example, each target device on the initial list may be checked against the router list. If a given target device on the initial list matches one on the router list, the MAC address for the device on the router list may be associated with the appropriate device on the initial list. Alternatively, all the devices listed on the router list may be eliminated from the initial list as not requiring further configuration. For example, the devices on the router list may be eliminated from the list generated at 504. Alternatively, all the devices listed on the router list may be added to the initial list as requiring configuration. For example the devices on the router list may be added to the list generated at 514.

At Block 508, a list of target devices that have been logged in a DHCP log of recent requests and/or acknowledgements is compared to either the initial list generated at 504 or at 514. The initial list of target devices is modified based on the list of target devices in the DHCP log. For example, each target device on the initial list may be checked against the DHCP log. If a given target device on the initial list matches one on the DHCP log, the MAC address for the device on the DHCP log may be associated with the appropriate device on the initial list. Alternatively, all the devices listed on the DHCP log may be added to the initial list as requiring configuration. For example the devices on the DHCP log may be added to the list generated at 514.

At Block 510, a list of target devices that have been included in a PXE request packet is compared to either the initial list generated at 504 or at 514. The initial list of target devices is modified based on the list of target devices in the PXE request packet. For example, each target device on the initial list may be checked against the PXE request packet. If a given target device on the initial list matches one on the PXE request packet, the MAC address for the device on the PXE request packet may be associated with the appropriate device on the initial list. Alternatively, all the devices listed on the PXE request packet may be added to the initial list as requiring configuration. For example the devices on the PXE request packet may be added to the list generated at 514.

The diagram of FIG. 5 shows only one embodiment of the process of the present invention. For example, the steps illustrated at blocks 506, 508 and 510 may also occur in any order or any combination other than that shown.

At block 524, the process may review the initial list generated at 504 or 514 and discards target devices from the list that do not require configuration. Alternatively, as seen at block 534, the process may also review the initial list and discard target devices from the list that still do not have associated MAC addresses. The process may also perform both the steps indicate at block 524 and block 534 in any order or in any combination other than that shown.

At Block 544 a list is generated of target devices and their associated MAC addresses that require configuration.

At Block 554, this list is provided to the server or an administrator of the server.

At Block 564 the server or administrator of the server may then configure the target devices on the list for OS software distribution.

While the present invention has been described in the context of a fully functioning data processing system, it will be appreciated that the processes described may be distributed in any other suitable context. For example, the processes described may take the form of a computer readable medium of instructions. The present invention applies equally regardless of the type of signal bearing media actually used to carry out the distribution. Examples of computer readable media include recordable-type medium, such as a floppy disk, a hard disk drive, a RAM, CD-ROMs, DVD-ROMs, and transmission-type media, such as digital and analog communications links, wired or wireless communications links using transmission forms such as, for example, radio frequency and light wave transmissions. The computer readable media may take the form of coded formats that are decoded for actual use in a particular data processing system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. A method of generating a list of target devices to be configured in communication with a server, comprising:
   creating a first list of target devices to be configured;
   identifying at least one addressed target device having an associated network address;
   modifying the first list of target devices using the addressed target device; and
   generating a modified list of target devices to be configured, wherein the target devices are to be remotely booted by the server.

2. The method of claim 1 wherein the addressed target device is listed in at least one information source.

3. The method of claim 1 further comprising:
   adding the associated network address of the addressed target device to the first list of target devices.

4. The method of claim 1 further comprising:
   adding the addressed target device having an associated network address to the first list of target devices.

5. The method of claim 1 further comprising:
   removing the addressed target device having an associated network address from the first list of target devices.

6. The method of claim 1 further comprising:
   pre-configuring at least one preconfigured target device.

7. The method of claim 6 further comprising:
   adding the preconfigured target device to the first list.

8. The method of claim 1 further comprising:
   determining if a target device has an associated network address; and
   removing the target device from the modified list of target devices if it does not have an associated network address.

9. The method of claim 1 further comprising:
   providing the modified list to the server.

10. The method of claim 1 further comprising:
    examining packet data to determine if a target device has an associated network address.

11. The method of claim 1 further comprising:
    examining log data to determine if a target device has an associated network address.

12. The method of claim 1 further comprising:
    creating a router list of target devices;
    comparing the muter list and the first list of target devices, and wherein
    modifying the first list of target devices using the addressed target device comprises modifying the first list of target devices based on the comparison.

13. A computer readable medium including computer readable code for generating a list of target devices to be configured in communication with a server comprising:
    means for creating a first list of target devices to be configured;
    means for identifying with an identification at least one addressed target device having an associated network address;
    means for modifying, the first list of target devices using the addressed target device; and
    means for generating a modified list of target devices to be configured, wherein the target devices are to be remotely booted by the server and wherein the target devices are persistently and concurrently in communication with the server by means of a network.

14. The medium of claim 13 further comprising:
    means for storing the identification of the addressed target device.

15. The medium of claim 13 further comprising:
    means for adding the associated network address of the addressed target device to the first list of target devices.

16. The medium of claim 13 further comprising:
    means for adding the addressed target device having an associated network address to the first list of target devices.

17. The medium of claim 13 further comprising:
    means for removing the addressed target device having an associated network address from the first list of target devices.

18. The medium of claim 13 further comprising:
    means for preconfiguring at least one target device listed in the first list.

19. The medium of claim 13 further comprising:
    means for removing a target device without an associated network address from the modified list of target devices.

20. The medium of claim 13 further comprising:
    means for configuring the target devices listed in the modified list.

21. The medium of claim 13 further comprising:
    means for examining packet data to determine if a target device has an associated network address.

22. The medium of claim 13 further comprising:
    means for examining log data to determine if a target device has an associated network address.

23. A data processing system, the system including target devices and a server comprising:
    means for creating a first list of target devices to be configured, wherein the target devices are to be remotely booted by the server;

means for identifying at least one addressed target device having an associated network address;

means for comparing the addressed target device to the target devices on the first list; and means for generating a modified list of target devices to be configured based on the addressed target device and wherein the target devices are persistently and concurrently in communication with the server by means of a network.

24. The system of claim 23, further comprising:
means for storing information about the addressed target device.

25. The system of claim 23 further comprising:
means for configuring at least one target device.

26. The system of claim 23 further comprising:
means for determining if a target device has an associated network address.

\* \* \* \* \*